United States Patent

Spergel et al.

[15] 3,658,478
[45] Apr. 25, 1972

[54] FLUID ANALYZING APPARATUS

[72] Inventors: Philip Spergel, Lexington; Stanley L. Gaines, Wayland; William Maxwell, Boxboro; Ronald McFayden, Waltham; Thomas A. Rosse, Lexington; David E. Blackmer, Harvard, all of Mass.

[73] Assignee: Instrumentation Laboratory, Inc., Lexington, Mass.

[22] Filed: Apr. 7, 1970

[21] Appl. No.: 27,200

[52] U.S. Cl. ........................ 23/253 R, 23/255 E, 324/30, 204/195 P
[51] Int. Cl. .............. G01n 27/00, G01n 31/00, G01n 33/16
[58] Field of Search .................. 23/253, 230 B, 259, 254 E, 23/255 E; 204/195 T, 195 P; 324/29, 30

[56] References Cited

UNITED STATES PATENTS

| | | | |
|---|---|---|---|
| 3,556,950 | 1/1971 | Dahms | 23/253 X |
| 3,560,161 | 2/1971 | Webb | 23/253 |
| 3,250,118 | 6/1966 | Johnson, Jr. | 23/253 X |

*Primary Examiner*—Joseph Scovronek
*Attorney*—Willis M. Ertman

[57] ABSTRACT

A fluid sample analysis instrument includes two sample chambers with an electrode assembly associated with each sample chamber. The instrument includes a common pump system for applying reduced pressure to the sample chambers to produce flow of fluid into and out of the sample chambers and a common circulator system for circulating fluid past the electrode assemblies and sample chambers to maintain the sample chambers and electrode assemblies at a pre-established temperature.

9 Claims, 8 Drawing Figures

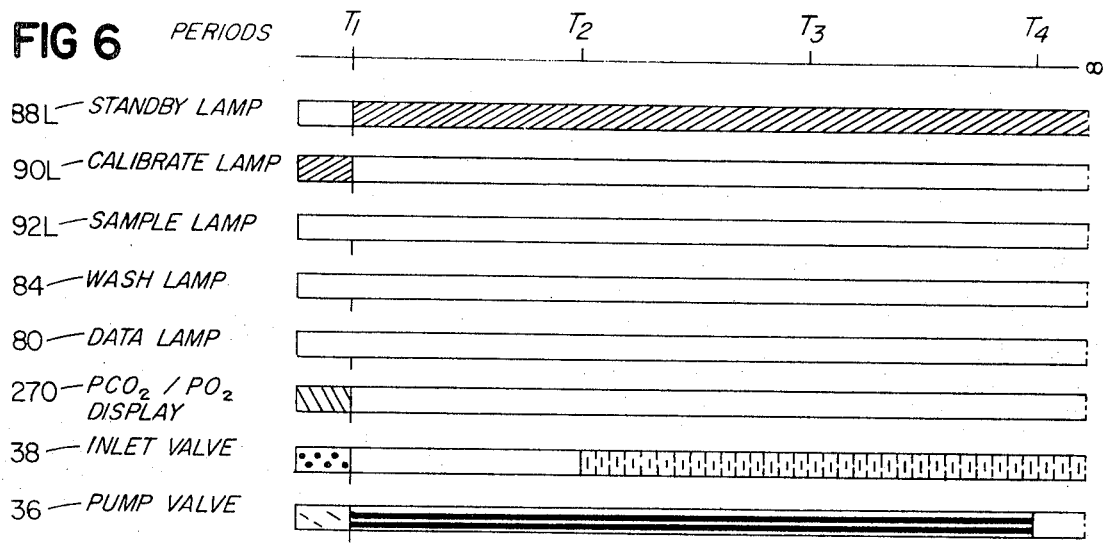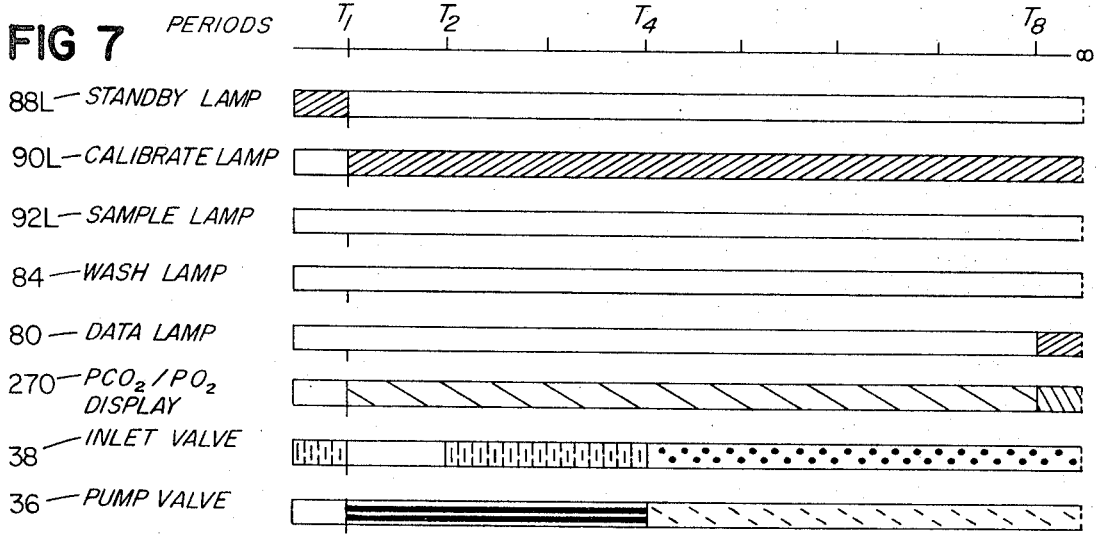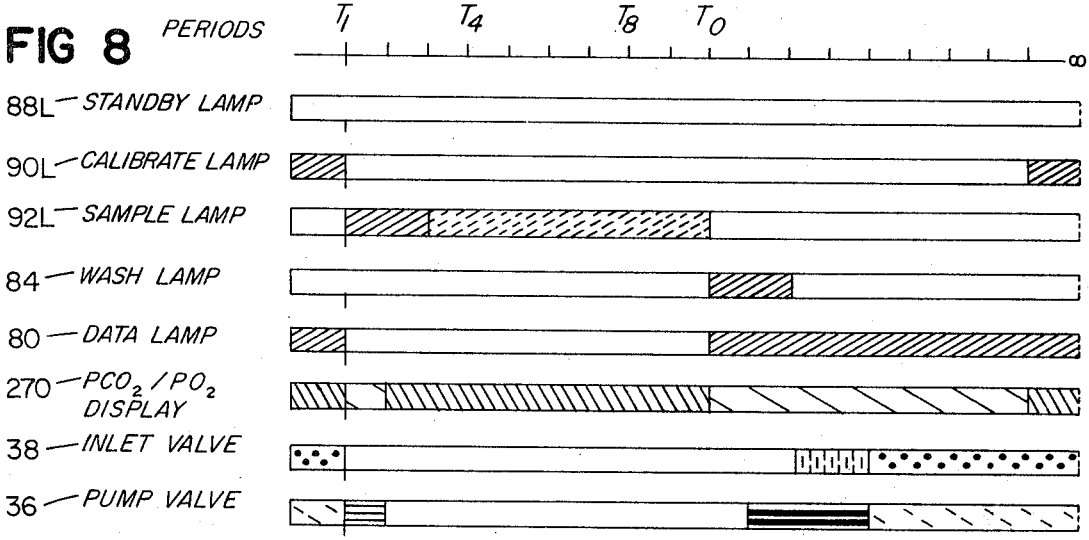

FLUID ANALYZING APPARATUS

SUMMARY OF INVENTION

This invention relates to analysis apparatus and more particularly to apparatus for analysis of fluid samples. It has particular application to apparatus for the analysis of parameters of precious fluids such as blood.

Frequently, an accurate measurement of one or more constituents of a fluid sample is desired. For example, the values of one or more gaseous constituents of a sample of blood may be significant. Such information may be used for a variety of purposes, including the obtaining of diagnostic information or life support controls. In particular instances, the pH, $Pco_2$ and $Po_2$ values of blood specimens provide important information concerning the patient's health, and it is an object of this invention to provide novel and improved instrumentation systems for these purposes. Another object of the invention is to provide novel and improved instrumentation systems which enable simplified analysis of fluid samples.

Another object of the invention is to provide novel and improved apparatus that is easy to operate and provides accurate analyses of constituents of precious fluids such as blood.

Still another object of the invention is to provide novel and improved analysis apparatus for simultaneously analyzing a plurality of gases in a fluid.

Still another object of the invention is to provide novel and improved apparatus for automatically analyzing fluid samples.

A further object of the invention is to provide novel and improved apparatus for providing precise measurements of constituents of fluid samples in an automated manner.

In accordance with a feature of the invention there is provided a fluid sample analysis instrument having a plurality of sample chambers, each sample chamber having an inlet and an outlet, and an electrode assembly for sensing a constituent of a sample held in the sample chamber. Each electrode assembly produces an output signal as a function of a constituent of interest of the sample in its chamber. A common pump system applies reduced pressure to the sample chambers to produce flow of fluid into and out of the sample chambers and a common circulator system circulates thermostatically controlled fluid past the electrode assemblies and the sample chambers to maintain the sample chambers and electrode assemblies at a pre-established temperature.

In accordance with another feature of the invention, a gas analysis instrument has a sample chamber with an inlet and an outlet, and an electrode assembly for sensing a gaseous constituent of a sample held in the sample chamber. The electrode assembly includes a selectively permeable membrane disposed for exposure to the sample in the sample chamber and output circuitry for producing an output signal as a function of a gas of interest permeating through the membrane of the electrode assembly. The instrument also has a sample inlet, a calibrating fluid inlet, a cleaning fluid inlet. A first valve is connected to the inlet of the sample chamber for controlling flow of fluid to the sample chamber and has a first position for connecting the sample inlet to the sample chamber inlet, a second position for connecting the calibrating fluid inlet to the sample chamber inlet, and a third position for connecting the cleaning fluid inlet to the sample chamber inlet. A second valve is connected to the outlet of the sample chamber and has a first position for connecting the sample chamber to a pump, a second position for connecting the sample chamber to the atmosphere, and a third position for blocking the outlet of the sample chamber. A sequencer controls the operation of the two valves. The sequencer is arranged to place the second valve in a fast flow mode during a cleaning sequence facilitating rapid, efficient cleaning, in a slow flow mode during a sample induction sequence enabling the system to accurately analyze small samples of precious fluid in the data mode, in a vent mode during a calibration sequence so that calibrating gas can be flowed through the sample chamber with a slight positive pressure thus facilitating calibration of the electrode assembly and in an inhibit mode during standby. The sequencer is operative in response to a first request for controlling the first and second valves to channel cleaning fluid and then calibrating fluid through the sample chamber in a calibrating sequence; and in response to a second request for drawing sample into the sample chamber for sensing by the constituent sensors during a sample measuring interval. The sequencer further includes control for optionally extending the duration of a sample measuring interval permitting the position of the sample in the chamber to be adjusted and readings of desired accuracy to be easily obtained. Control logic responds to push button commands and visual signals indicate the progress of the analysis.

A particular embodiment of the invention incorporates sensors for measuring $Pco_2$ and $Po_2$ of a blood sample in one sample chamber and a sensor for measuring pH in a second sample chamber. The typical sample volume required for all three measurements is less than 0.4 milliliters. Transparent sample chambers are provided so that the sample is directly visible in each chamber. The instrument provides data about one minute after initiation of the data sequence, the data being digitally displayed on suitable outputs. In addition, the output signals may be applied to a data acquisition system if desired.

The invention provides an instrument for analyzing constituents of a fluid sample, such as pH, $Pco_2$ and $Po_2$ in an automated manner. Samples are drawn automatically or manually by a peristaltic pump into the measuring chambers. Twenty-five samples per hour may be analyzed with a calibration sequence prior to each sampling.

Other objects, features, and advantages of the invention will be seen as the following description of a particular embodiment progresses, in conjunction with the drawings, in which:

FIGS. 6–8 are timing diagrams indicating the operation of the system in the standby, calibrate, and sample (data) modes, respectively.

DESCRIPTION OF PARTICULAR EMBODIMENT

Figure 1:
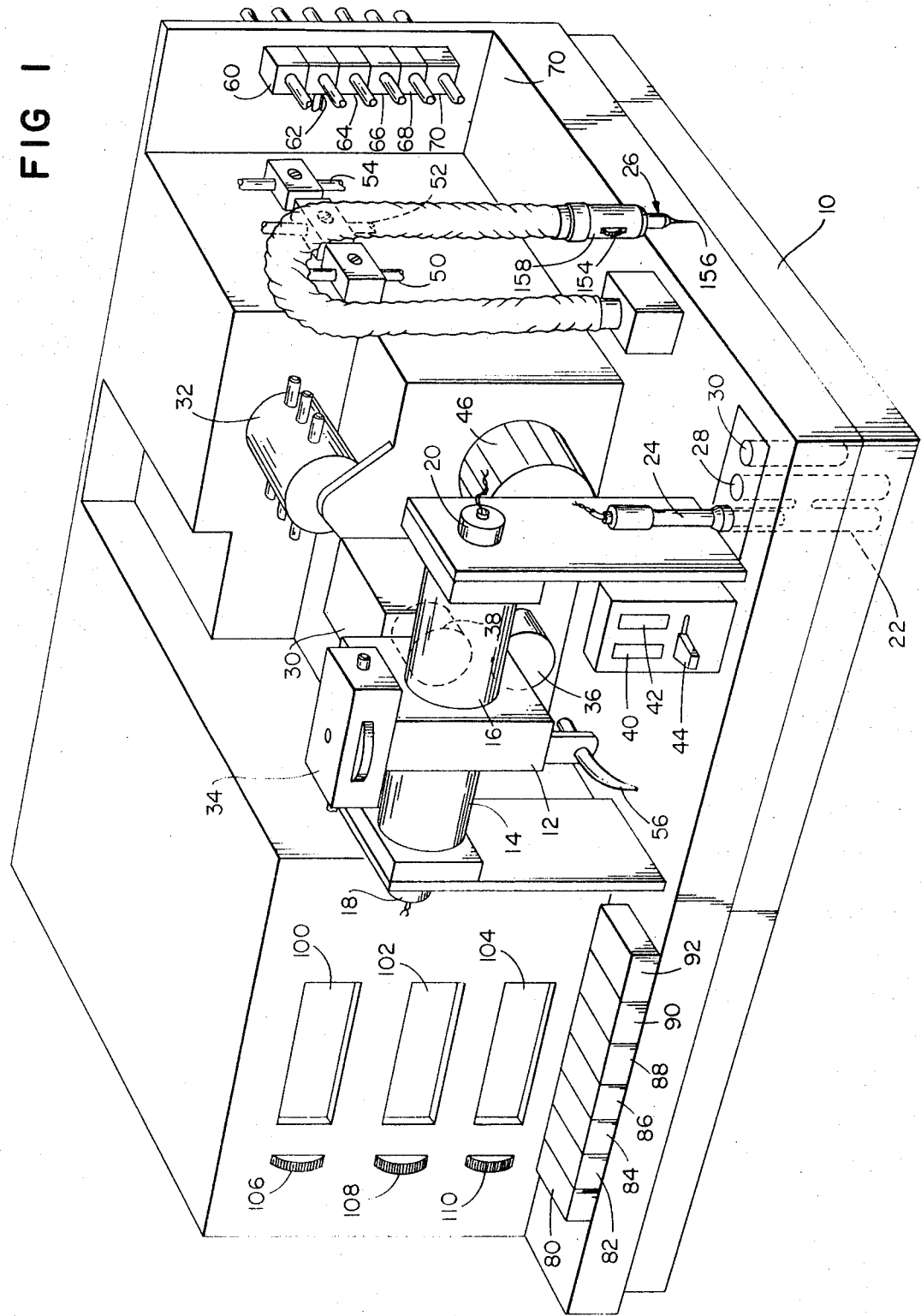
FIG. 1 is a perspective view of a blood gas analysis system constructed in accordance with the invention.
Figure 2:
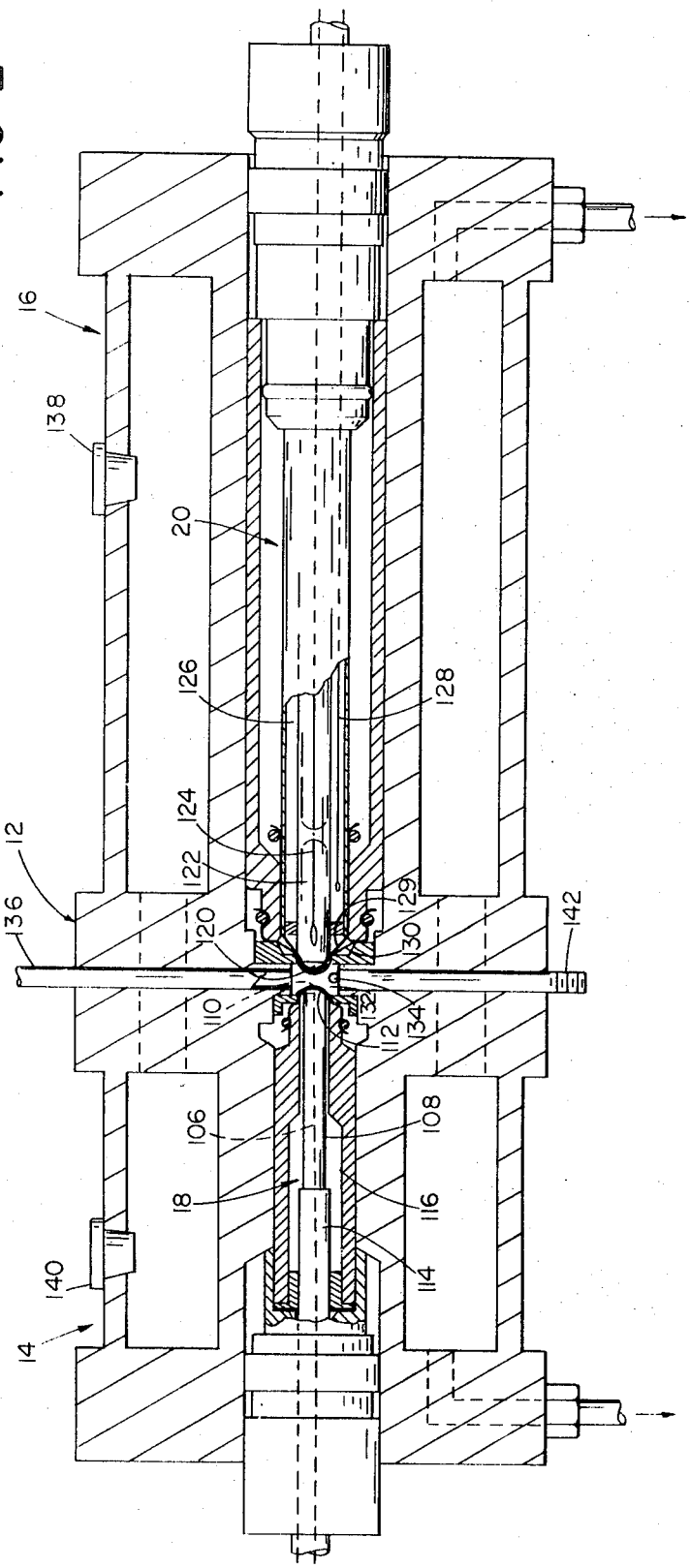
FIG. 2 is a sectional view, taken along the line 2—2 of FIG. 1 showing details of the sample chamber and measuring electrodes employed in the system shown in FIG. 1.

A perspective view of a blood gas analysis instrument is shown in FIG. 1. The instrument includes a base 10 having a first section (normally enclosed with a removable panel (not shown)) which supports a transparent sample chamber structure 12 disposed between two water jacket sections 14, 16. Housed in water jacket section 14 is a $pO_2$ electrode assembly 18 (FIG. 2) and housed in water jacket section 16 is a $pCO_2$ electrode assembly 20 (FIG. 2). Also mounted on base 10 is a pH electrode assembly which includes a junction assembly 22, a reference electrode 24 disposed in one section of the junction assembly 22 and a pH electrode assembly 26 arranged for disposition in portion 28 of junction assembly 22. Chamber 30 receives electrode assembly 26 when that assembly is not in use.

Also mounted on base 10 is a heater 30, a three channel peristalic pump 32 (shown in FIG. 1 with the PVC tubing removed); a manually operated peristalic pump 34; a four way pump control valve 36; a three way inlet control valve 38; two bubble chambers 40, 42; a gas selector switch 44; a water circulator 46; and three needle valve assemblies 50, 52, 54. Projecting forwardly of the panel is a replaceable sampling tip 56. At the rear of the housing are a set of fluid connections; "high" gas connection 60, "low" gas connection 62, equilibrate gas connection 64, waste connection 66, flush connection 68, and vent connection 70.

On the front panel of the instrument are a set of seven indicators and/or controls: a data ready indicator and entry button 80, a temperature indicator 82, a wash indicator 84, a membrane failure indicator 86, a standby mode indicator and button 88, a calibrate mode indicator and button 90, and a sample mode indicator and button 92. Above the set of lamps and buttons are three digital displays, a pH display 100, a $pCO_2$ display 102 and a $pO_2$ display 104. A balance control 106, 108 and 110 is associated with each display. In addition, the system includes slope and zero controls on the left wall of the housing (not shown in FIG. 1).

With reference to FIG. 2, the $pO_2$ electrode 18 produces a current at a constant polarizing voltage which is directly proportional to the tension of oxygen diffusing to the reactive cathode surface of the electrode. The 0.001 inch diameter cathode wire 106 is sealed in a glass envelope 108 so that only its tip 110 is exposed at the end of the electrode. This reactive surface 110 is covered by a polypropylene membrane 112 which is permeable to oxygen but not to contaminants and reducible ions of the sample. To provide electrons for the cathode reaction, a silver/silver chloride anode 114 is incorporated in the electrode and housed in an electrolyte chamber 116.

The $pCO_2$ electrode 20 includes a pH sensitive glass membrane 120 at its tip and forming an end wall of an inner chamber 122 in which is housed a silver/silver chloride electrode 124. The outer chamber 126 is filled with a $pCO_2$ electrolyte and contains a silver/silver chloride reference electrode 128. Disposed over the end of the electrode assembly is a nylon membrane 129 and a silastic membrane 130 that is permeable to carbon dioxide gas but not to ions.

The membrane covered tip of each electrode is disposed in sample chamber 132 for direct exposure to the sample that is supplied to chamber 132 through inlet 134 and removed from that chamber through outlet 136. Water jacket sections 14 and 16 are filled through plugs 138, 140 and the sample chamber and electrodes are maintained, at a thermostated temperature by circulation (by circulator 46 in FIG. 1) of a thermostating fluid that is maintained at a preset temperature, typically 37° C., by heater 30 (FIG. 1) into chamber assembly 12 and then through water jacket sections 14 and 16. Electrode 142 applies a signal to chamber 132 for sensing membrane integrity.

The pH electrode system (FIG. 3) includes a capillary section 148 of pH sensitive glass in which the sample is drawn from line 150 either by vacuum applied via tube 152 by pump 32 or by operation of roller assembly 154 (FIG. 1). A silver/silver chloride half cell is disposed in an electrolyte chamber that surrounds the capillary tube 148. A replaceable sampling tip 156 is pressed onto the tip of the measuring electrode assembly and surrounding the measuring electrode is a water jacket 158. The reference electrode 24 contains a saturated calomel half cell, and the junction assembly 22 contains a saturated KCl solution and establishes electrical contact between the reference electrode 24 and the sample in the capillary of the measuring electrode 26 when the measuring electrode assembly 26 is disposed in receptacle 28.

Figure 3:
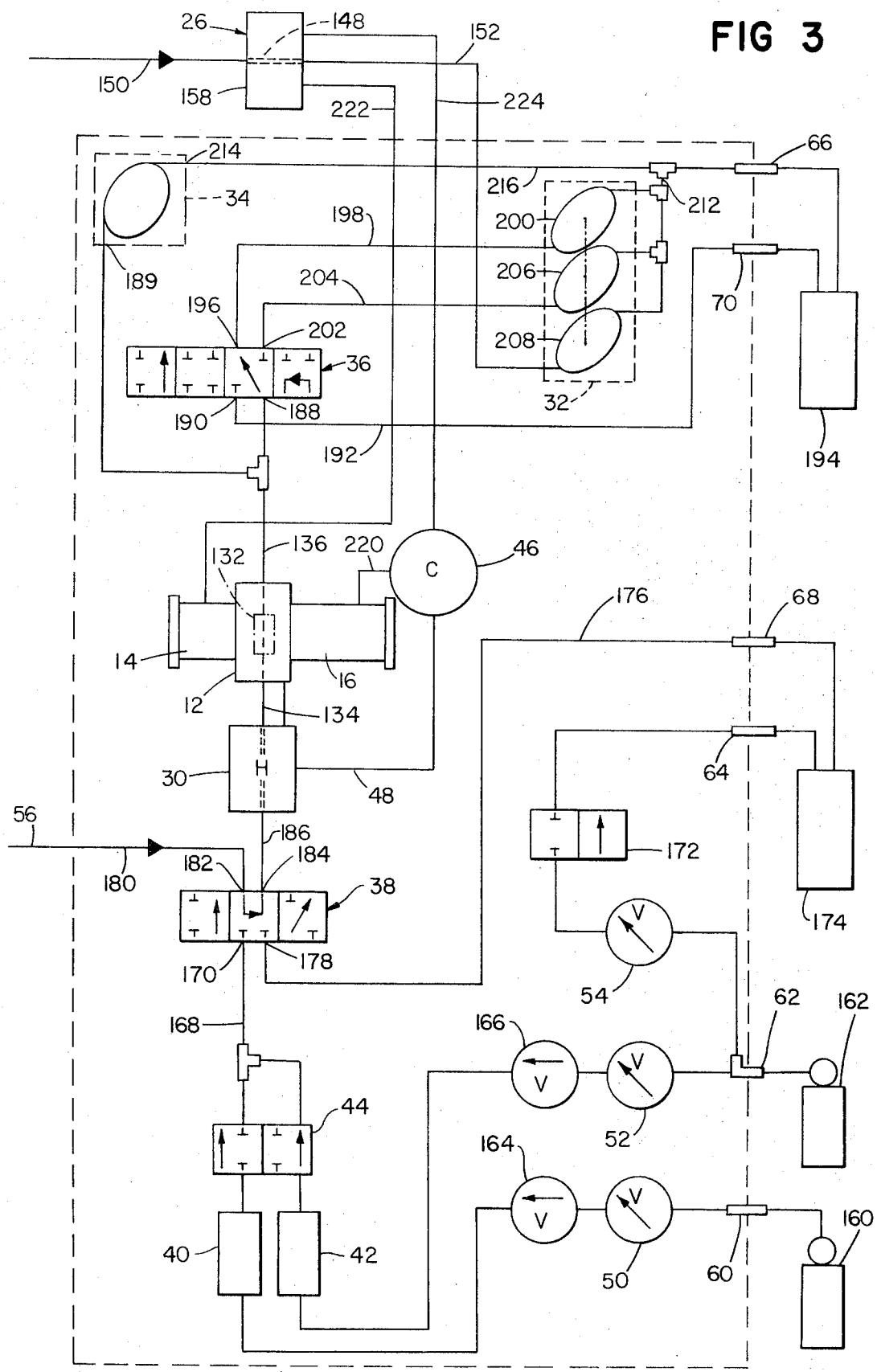
FIG. 3 is a diagram showing the fluid flow paths and interconnections employed in the system shown in FIG. 1.

A diagram of the circulation paths in the instrument is shown in FIG. 3. Analyzed gases of known oxygen and carbon dioxide content are used as calibration standards for the electrode assembly 18 and 20. A "high" gas mixture 160 of about 10 percent carbon dioxide and the remainder nitrogen is used to slope the $pCO_2$ electrode assembly 20 and zero the $pO_2$ electrode assembly; and a "low" gas mixture 162 of about 5 percent $CO_2$, 12 percent $O_2$ and the balance nitrogen is used to slope the $pO_2$ assembly 18 and balance the $pCO_2$ assembly 20 and is routinely used to simulate the carbon dioxide tension of normal arterial blood. The "high" gas supply 160 is connected through coupling 60, needle valve 50, fluid diode 164, and bubble chamber 40 to selector valve 44, and the "low" gas supply 162 is connected through coupling 62, needle valve 52, diode 166, and bubble chamber 42 to the selector valve 44. That valve has two positions, a first position in which bubble chamber 42 is connected via outlet line 168 to valve inlet port 170 and a second position in which bubble chamber 40 is connected to outlet line 168. The gases are humidified by passing through the bubble chambers 40, 42 to avoid drying the membranes 112, 130 during calibration. Each bubble chamber is filled with distilled water and each calibrating gas is passed through the respective chamber at a pressure of about 3½ p.s.i.g. for equilibration purposes. Flow rates are controlled by the needle valves 50, 52 to provide a bubble rate through each chamber of two bubbles per second.

Thermostated water typically at a temperature of 37° C. is circulated by circulator 46 through heater 30 and into the sample chamber structure 12 for flow to the water jackets 14 and 16 that surround the sample chamber 132 and electrodes 18 and 20. Water from jacket 14 is returned to the circulator 46 over line 220 while water from jacket 16 is transferred over line 222 to the water jacket 158 of the pH electrode assembly 26 and then returned to the circulator 46 over line 224.

Gas from supply 162 is also coupled through needle valve 54, solenoid operated gas saver valve 172 and coupling 64 to a flush solution bottle 174 which stores a cleaning solution that is circulated through the sample chamber 132 and the sample lines to remove protein deposits and prevent occluding of those lines. Flush solution from reservoir 174 is supplied through coupling 68 and line 176 to a second input port 178 of inlet valve 38. Fluid from sampling tip 56 is also supplied over line 180 to a third inlet port 182 of valve 38. The outlet port 184 of valve 38 is connected over line 186, through heater 30 and the inlet line 134 to sample chamber 132. The outlet line 336 is connected to inlet port 188 of pump valve 36 and to the inlet port 189 of manual pump 34.

Pump valve 36 has a vent outlet port 190 connected via line 192 and connector 70 to waste container 194; an outlet port 196 connected via line 198 to the slow section 200 of pump 32 (which pumps at a rate of about 25 microliters per second); and outlet port 202 connected via line 204 to the fast section 206 of pump 32 (which pumps at a rate of about 200 microliters per second). The third section 208 of pump 32 has an input over line 154 from the pH electrode assembly 26 and assists sample induction and flushing of that assembly. The outlet of each section of the pump is connected via a common line 212 and connector 66 to the waste container 194, and similarly the outlet 214 of manual pump 34 is connected via line 216 and connector 66 to the waste container 194.

The gas saver valve 172 is open at all times other than when the instrument has completed the standby flush cycle and the flush solution is equilibrated with the low gas 162 to minimize shock to the electrodes and to maintain them close to normal sample equilibration values so that a rapid electrode response time during sample analysis is provided.

Figure 4:
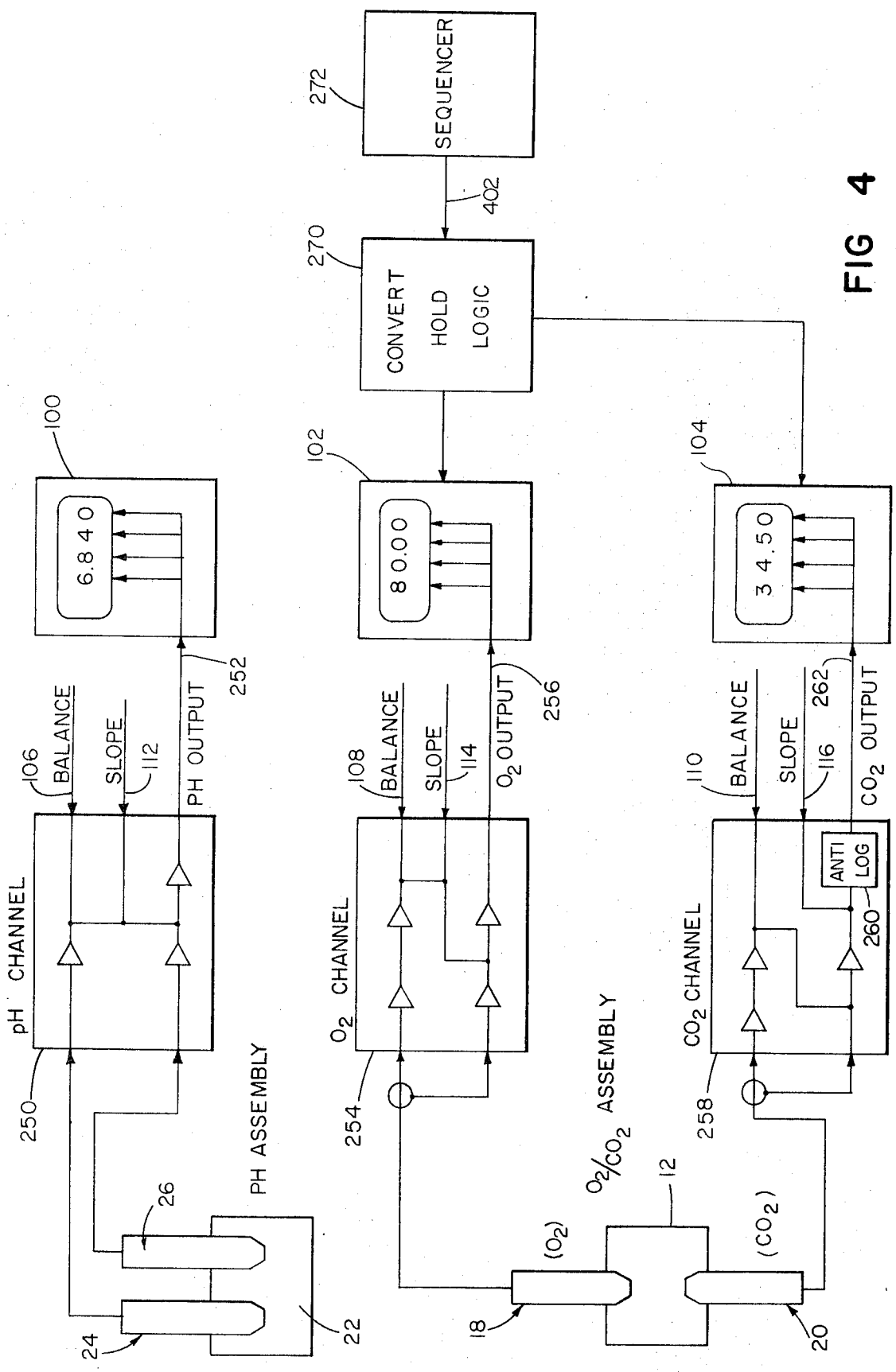
FIG. 4 is a diagrammatic view of the readout circuitry.

With reference to FIG. 4, the circuitry 250 senses the potential developed between the pH sensitive glass half cell 26 and the reference electrode half cell 24 and translates that into an output signal applied on line 252 to the digital display 100. A pH balance control 106 enables a small potential difference, caused by such things as curvature of the pH glass, to be cancelled out by adding the same potential with opposite polarity to provide a zero reading (e.g. pH 6.840) on the display 100. With a second buffer of pH 7.384, the gain of the amplifier may be adjusted with slope control 112 until the display 100 reads pH 7.384.

A constant polarizing voltage is applied across the cathode and anode electrodes of the $O_2$ electrode 18 and the translating circuitry 254 senses the resulting current flow and translates that signal into an output on line 256 for application to display 102. The translating circuit 254 has similar balance and slope adjustments 108, 114. The high (zero concentration $O_2$) gas is used for balance of the oxygen electrode and slope is adjusted with the low (12 percent $O_2$) gas.

The $pCO_2$ electrode system 20 is an adaptation of the pH electrode as the $CO_2$ diffused through membrane 130 changes the pH of the electrolyte behind that membrane. The output voltage from the $pCO_2$ electrode 20 is exponentially related to the partial pressure of carbon dioxide and the translation circuitry 258 includes an antilog conversion circuit 260 and generates an output signal on line 262 which is applied to display 104. In like manner the display is calibrated utilizing the balance and slope controls 110, 116, respectively. The low (5 percent $CO_2$) gas is used for balance and the high (10 percent $CO_2$) gas is used to adjust the slope response of the circuitry.

Convert/hold logic 270 responsive to sequencer 272 locks the displays 102 and 104 at specified times in the operating cycle.

Figure 5:
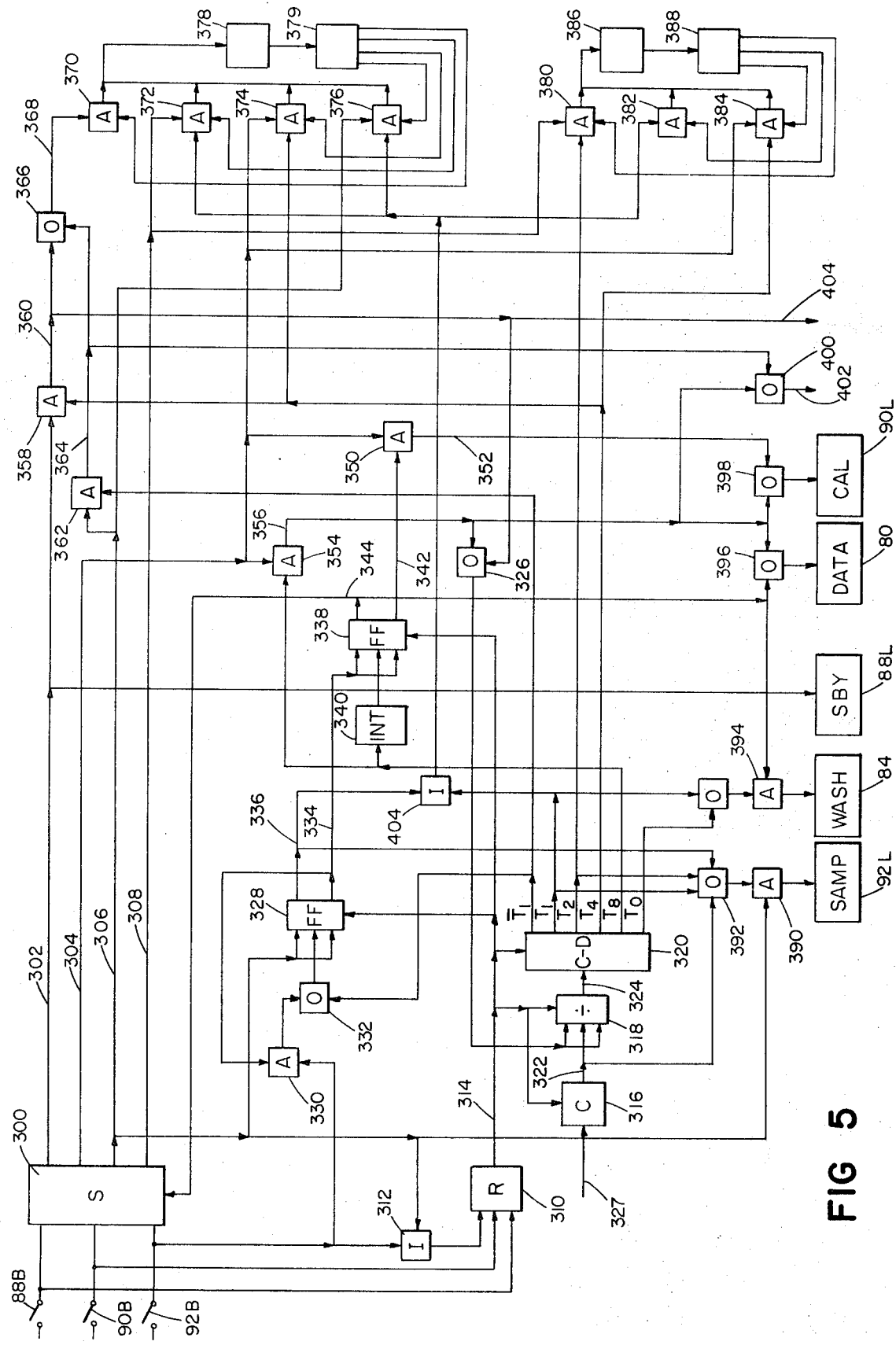
FIG. 5 is a logic diagram of the sequencer logic employed in the system shown in FIG. 1.

A diagram of the control logic is shown in FIG. 5. Depression of a pushbutton 88B, 90B, 92B sets Status circuit 300 to produce a corresponding output on its output lines 302, 304, 306 and 308. Depression of any pushbutton also applies a reset signal via Reset logic 310 for resetting logic elements in the circuitry. The reset circuit 310 produces output pulses on cable 314 a 7 millisecond pulse to reset counter 324 and a 30 millisecond pulse to reset the clock 318 and flip flops 328, 338. Sequencer logic includes Clock 316, Divide circuit 318 and BCD Counter and Decoder circuit 320. Circuit 320 produces outputs TO, T1, T1, T2, T4 and T8. Clock 316 produces output pulses on line 322 at 1 second intervals. Divide circuit 318 produces pulses on line 324 at 4 second intervals so that the mode of the counter-decoder is changed at 8 second intervals. Thus, for example, the T1 level exists for 8 seconds. An output from OR circuit 326 terminates the production of signals by the divide circuit 318 until that circuit is reset by a signal from the reset circuit 310. Optionally, either analog or binary coded decimal outputs of the data applied to displays 100, 102 and 104 may be transferred to a data acquisition system. A signal on line 327 inhibits the generation of clock pulses in a "computer latch" operation until the data acquisition system signals that it has acquired the data.

The control logic also includes extend logic that includes Extend flip flop 328 and two AND circuits 330, 332; and end sample logic that includes End Sample flip flop 338 and integrator 340.

The Extend flip flop 328 is conditioned by an output signal on line 306 to respond to a further depression of pushbutton 92B through AND circuit 330 and OR circuit 332 and to be cleared by the T1 pulse through OR circuit 332. The End Sample flip flop 338 is conditioned to be set by an EXTEND signal from flip flop 328 over line 334 and is set at T10 time by integrating the T8 pulse that is applied to integrator 340. End Sample signal on line 344 from flip flop 338 is applied to status circuit 300 to change the status from Sample mode to Calibrate mode, terminating the output signal on line 306 and producing output signals on line 304 and 308.

AND circuit 350 produces an output on line 352 in response to the CAL mode signal on line 304 and an END SAMPLE output from flip flop 338 on line 342; and AND circuit 354 produces an output on line 356 in response to the CAL mode signal on line 304 and the T8 signal from counter-decoder 320. AND circuit 358 produces an output on line 360 in response to SBY mode signal on line 302 and the T4 signal from decoder 320; AND circuit 362 produces an output on line 364 in response to the SAMP mode signal on line 306 and the T1 signal; and OR circuit 366 produces an output on line 368 in response to an input from either AND circuit 358 or 362.

The control logic further includes a set of four AND circuits 370, 372, 374 and 376 which control the drive 378 for the pump valve 36; and a set of three AND circuits 380, 382 and 384 which control the drive 386 for the inlet valve 38. A feedback signal from each valve drive via feedback circuits 379, 388, respectively, is applied to the corresponding AND circuit to stop operation of the drive when the valve has reached the corresponding position.

The Sample lamp 92L is energized in Sample mode by the SAMP signal applied to AND circuit 390 from line 306 of status circuit 300. A second input to AND circuit 390 is from OR circuit 392 which has a first input from the clock 310 at one second intervals and produces a flashing energization of lamp 92L unless overridden, a second input from the EXTEND signal on line 336 by which lamp 92L is maintained continuously lighted after the EXTEND flip flop 388 is set until it is cleared by the T1 pulse; and T1 and T2 inputs from circuit 320. (Modifications of this timing may be provided as desired for particular operational purposes.)

The Wash lamp 84 is energized when the End Sample flip flop 338 is set by a signal on line 344 applied to AND circuit 390 for the next two cycle times (T0 and T1). (Again the duration of this signal may be varied as desired.)

The Data lamp 80 is energized via OR circuit 396 when the End Sample flip flop 338 is set or, in a Calibrate cycle, by the output at the end of the calibrate cycle from AND circuit 354. The Calibrate lamp 90L is energized via OR circuit 398 by an output from AND circuit 350 at the start of the Calibrate cycle or in the Sample cycle when the End Sample flip flop is cleared, by an output from AND circuit 354. The convert hold logic 270 is conditioned by a signal from OR circuit 400 which responds to a signal from AND circuit 354 at the end (T8 time) of the Calibrate mode and a signal from AND circuit 362 during the sample mode (T1 time).

Further understanding of this control logic may be had with reference to FIG. 5 and the timing diagram in FIG. 6. When Standby button 88B is depressed, Status circuit 300 produces an output on line 302 which lights Standby lamp 88L and an output on line 308. At the same time a signal is applied to reset circuit 310 to generate on cable 314 a 7 microsecond pulse to reset the BCD Counter and Decoder 320 and a 30 microsecond signal to reset the clock 316, the Divide circuit 318 and flip flops 328 and 338. The next signal from divider 318 triggers Counter-Decoder 320 to produce the T1 signal which is passed through AND circuit 372 to energize valve drive 378 and move the pump valve 36 to the fast position, connecting inlet line 188 with outlet line 202. When valve 36 reaches this position, a signal from the feedback circuit 359 removes a conditioning input from AND circuit 372, de-energizing valve drive 378. The T1 signal is also applied to AND circuit 382 and valve drive 386 is energized to move inlet valve 38 to the sample position, connecting sample line 180 to output line 186 (feedback circuit 388 de-energizing pump drive 356 when that position is reached). In this condition air is drawn in through sample line 180. In the next cycle, the Counter-Decoder 320 generates a T2 pulse and AND circuit 380, conditioned by the previously present SAMP signal on line 308, operates valve drive 380 to move the inlet valve 38 from the sample position to the flush position, connecting line 176 to outlet line 186. In this condition, flush solution is drawn through the cuvette chamber 132.

When Counter-Decoder 320 generates the T4 pulse, AND circuit 358 is conditioned and its output is applied through OR circuit 366 to energize AND circuit 370 and operate the pump valve drive 378 to move valve 36 to the inhibit position, sealing flush solution within the tubing 134, 136 in the cuvette chamber 132. The electrode membranes 112, 130 are thus kept moist by the equilibrated flush solution, and the instrument can be left overnight in this mode. The output from AND circuit 358 is also applied through OR circuit 326 to terminate the production of pulses from Divide circuit 318 and also over line 404 to de-energize the gas saver valve 172 and to turn off the pump drives and the display. In this mode, the only lamp that is left energized is the Standby lamp 88L.

With reference to FIGS. 5 and 7, in preparation for an analysis, the instrument is calibrated with two analyzed gases from sources 160 and 162. Depression of button 90B applies a signal to the Status circuit 300 to produce an output on lines 304 and 308 and also applies a signal to the Reset circuit to reset the control logic. The output on line 304 is applied to AND circuits 350, 354, 374, and 384. As End Sample flip flop 338 is not set, AND circuit 350 has an output and, via OR circuit 398, lights Calibrate lamp 90L.

The output on line 308 is applied to AND circuits 372 and 380. When Counter-Decoder 320 generates the T1 signal, AND circuit 372 has an output which operates drive 378 to place the pump valve 36 in the fast position and AND circuit 382 has an output which operates inlet valve drive 386 to place valve 38 in the sample position. Air is drawn in through the cuvette chamber until the T2 signal is generated. At that time, AND circuit 380 has an output which moves inlet valve 38 to the flush position, and flush solution is pumped through the sample chamber 132 for two time periods. With the generation of the T4 signal, an output from AND circuit 384 moves inlet valve 38 to the calibrating gas position, connecting input line 168 with output line 186, and an output from AND circuit 374 moves pump valve 36 to the vent position. The calibrating gas, as selected by the position of valve 44, then flows through the sample chamber 132 for equilibration with the electrodes and permitting the instrument to be calibrated as above described. The T8 pulse from Counter-Decoder 320 is applied to AND circuit 354 and energizes the Data lamp 80 via OR circuit 396 and the Convert Hold logic 270 via OR circuit 400 to unclamp the displays 102, 104. This output signal is also applied through OR circuit 326 to terminate production of output signals by Divider 318. In this mode, each calibrating gas may be channeled through the cuvette chamber 132 as selected by valve 44, and the operator may slope and balance the electrode assemblies 18 and 20 with controls 108, 110, 114 and 116. The instrument remains in this state until another mode button is depressed.

When the response of the electrodes has been calibrated satisfactorily, the instrument is ready for sampling. With reference to FIGS. 5 and 8, with the sample tip 56 immersed in a blood sample to be analyzed, the Sample button 92 is depressed. In response to that operation, the Status circuit 300 produces an output on line 306 and the signal is applied through Inhibit circuit 312 to Reset circuit 310 which generates reset signals on cable 314.

When Counter-Decoder 320 produces a T1 signal, pump valve 36 is positioned in slow mode in response to an output from AND circuit 376 and inlet valve 38 is positioned in sample position in response to an output from AND circuit 382. Blood sample is drawn slowly into the sample chamber 132 during the first time period (T1). With the generation by Decoder 320 of the T1 signal, AND circuit 362 produces an output which is applied through OR circuit 366 and AND circuit 370 to move pump valve 36 to the inhibit position, stopping the pumping action. Due to the provision of a fluid capacitor between chamber 132 and valve 36, the sample continues to be drawn into the cuvette chamber at an exponentially decreasing velocity for another ten seconds, facilitating equilibration of the membranes and electrode assemblies 18, 20 with the blood sample. At the end of the T2 cycle, lamp 92 commences to flash at one second intervals in response to signals from the Clock 318 applied through OR circuit 392 and AND circuit 384, indicating that the sample tip 56 may be removed from the sample container. When Counter-Decoder 320 generates the T8 signal, that signal conditions Integrator 340 and its output at T10 time sets End Sample flip flop 338. The output on line 344 from End Sample flip flop 338 is applied to Status circuit 300 to change its condition from sample mode to calibrate mode, terminating an output on line 306 and producing outputs on lines 304 and 308. The output from the End Sample flip flop is also applied to data lamp 80 via OR circuit 396 and wash lamp 84 via AND circuit 394. At this time the Counter-Decoder 320 is producing the T0 signal and the wash lamp 84 is energized until the end of T1 time (2 clock periods), indicating that the sample tip 56 should be placed in the saline cleaning solution for introduction of that solution through the sample line 180 and into the cuvette chamber 132. With the termination of the signal from AND circuit 362, the output of OR circuit 400 terminates the Convert Hold circuit 270 clamps the displays. Also Sample lamp 92L is de-energized.

The Calibrate cycle is now repeated automatically with cycling of pulses from Counter-Decoder 320 to flush the sample chamber 132 (T2-T4 time) and then allowing calibrating gas to flow into the sample chamber 132. At T8 time the displays are released and the calibrating lamp 90L is energized so that the operator may check the instrument balance prior to the next sample without pressing the calibrate button 90B again. Another sample cycle may be run merely by inserting the sample in the cleaned sample tip and depressing the Sample button 92B.

If for any reason the normal sample interval allotted for equilibration of the sample is insufficient, a ten cycle extension period may be obtained during the interval when Sample lamp 92L is flashing merely by pressing the sample button 92B again. In this mode, the output on line 306 is applied to Inhibit circuit 312 and prevents this second signal from being applied to the reset circuit 310. The signal is applied to AND circuit 330 which has a conditioning input from the Extend flip flop 328 on line 334 and the output of AND circuit 330 is passed by OR circuit 332 to set flip flop 328 which produces an output on line 336 to condition Inhibit circuit 402 and to remove the conditioning level that is applied to flip flop 338 on line 334. The output on the Extend flip flop output line 336 is also applied through OR circuit 392 to terminate the flashing of Sample lamp 92L and maintain it continuously energized. This mode permits the operator to adjust the position of the sample in chamber 132 using manual pump 34 or to extend the Sample equilibration period. As the End Sample flip flop 338 is not set by the integrated T8 pulse, the sample cycle is repeated except that the T1 signal is inhibited by Inhibit circuit 404. With the generation of the T1 signal, flip flop 328 is cleared, re-establishing a conditioning input for AND circuit 330 and a conditioning input for flip flop 338. At the end of the T2 interval, Sample lamp 92L commences flashing again, indicating that the displays are active and responding to the sample in chamber 132. Unless the Sample button 92 is pressed again, the T1 signal will be generated in the next cycle and allow an End Sample signal to be generated on line 344 which lights the data lamp 80 and initiates sample removal and cleaning of the cuvette chamber 132 in preparation for calibration and running of the next sample.

Information concerning further details of this system may be had with reference to the following copending patent applications assigned to the same assignee as this application:

| Inventor | Title | S.N. | Filing Date |
|---|---|---|---|
| Haddad et al. | Electrode Assembly | 27,194 | Apr. 7, 1970 |
| Blackmer | Sensor Instrumentation | 27,198 | Apr. 7, 1970 |
| Blackmer | Fault Sensing Instrumentation | 27,197 | Apr. 7, 1970 |
| Spergel et al. | Fluid Handling Apparatus | 27,199 | Apr. 7, 1970 |
| Neuwelt | Fluid Sample Analyzing Apparatus | 27,193 | Apr. 7, 1970 |

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention.

What is claimed is:

1. A precious fluid sample analysis instrument comprising a plurality of sample chambers, each said sample chamber having fluid jacket structure, an inlet and an outlet, an electrode assembly associated with each sample chamber for sensing a constituent of a sample held in the sample chamber, each said electrode assembly producing an output signal as a function of a constituent of interest of the sample in its chamber, a plurality of sampling tip structures, each said sample chamber input being connected to a separate sampling tip structure, a common pump system connected directly to each said sample chamber outlet for applying reduced pressure to said sample chambers to produce flow of fluid into and out of said sample chambers, separate manually responsive controls for adjusting the position of fluid in each said sample chamber, and a common circulator system for circulating thermostatically controlled fluid through said sample chamber jacket structures past said electrode assemblies and said sample chambers to maintain the sample chambers and electrode assemblies at a pre-established temperature.

2. The instrument as claimed in claim 1 wherein one electrode assembly associated with a first sample chamber produces an output signal as a function of the pH of the sample in its sample chamber and the electrode assembly associated with a second sample chamber produces an output signal as a function of the partial pressure of a predetermined gas in the sample in its sample chamber.

3. The instrument as claimed in claim 2 wherein the electrode assembly associated with said second sample chamber includes a selectively permeable membrane disposed for exposure to the sample in said second sample chamber and output circuitry for producing an output signal as a function of a gas of interest permeating through said membrane.

4. A blood gas analysis instrument comprising a sample chamber, a plurality of electrode assemblies for sensing gaseous constituents of a sample held in said sample chamber, each said electrode assembly including a selectively permeable membrane disposed for exposure to the sample in said sample chamber and output circuitry for producing an output signal as a function of a gas of interest permeating through the membrane of the electrode assembly, two sources of calibrating fluids, a first valve connected to said two sources of calibrating fluids for selectively applying one of said calibrating fluids to an outlet line, a source of cleaning fluid, a relatively low capacity pump, a higher capacity pump, a second valve connected to the inlet to said sample chamber for controlling flow of fluid to said sample chamber, said second valve having a first position for connecting a sampling passage to said sample chamber, a second position for connecting said outlet line to said sample chamber, and a third position for connecting a source of cleaning fluid to said sample chamber, a third valve connected to the outlet of said sample chamber, said third valve having a first position for connecting the sample chamber to said relatively low capacity pump, a second position for connecting said sample chamber to said higher capacity pump, a third position for connecting said sample chamber to the atmosphere, and a fourth position for blocking the outlet of said sample chamber, a manually operable pump connected to said sample chamber for displacing fluid in said sample chamber, a circulator for circulating a thermostatically controlled fluid past said electrode assemblies and said sample chamber to maintain the sample chamber and electrode assemblies at a pre-established temperature, a fourth valve connected between one of said sources of calibrating fluid and said source of cleaning fluid for introducing calibrating gas into said cleaning fluid to reduce shock to the membranes of said electrode assemblies during exposure to said cleaning fluid in a flushing operation, and a sequencer for controlling the operation of said second and third valves, said sequencer having a first mode of operation in response to a first request for operating said second valve to connect said sample chamber to said cleaning fluid while said third valve is connected to said higher capacity pump; a second mode of operation in response to a second request for positioning said second valve to sequentially connect said sample chamber to said sample line, said cleaning fluid and a calibrating gas while said third valve is connected to said higher capacity pump and then switching said third valve to said fourth position; and a third mode of operation in response to a third request for positioning said second valve to connect said sample chamber to said sample line while said third valve is connected to said low capacity pump and then switching said third valve to said fourth position for a sample measuring interval.

5. The instrument as claimed in claim 4 wherein said sequencer includes control logic for providing visual indication of the operating mode of the instrument and means to modify said visual indication during said sample measuring interval.

6. The instrument as claimed in claim 5 wherein said control logic includes a status circuit having outputs indicating the operating mode of said instrument, and first bistable means responsive to the end of said sample measuring interval for changing the output of said status circuit.

7. The instrument as claimed in claim 6 wherein said control logic further includes logic for optionally deferring initiation of said calibration sequence for an interval of time to extend the duration of said sample measuring interval, said calibration sequence deferring logic including second bistable means responsive to an extend request for inhibiting the operation of said first bistate means to the end of said sample measuring interval.

8. The instrument as claimed in claim 7 and further including a second sample chamber having an inlet and an outlet, a second electrode assembly associated with said second sample chamber for sensing a constituent of a sample held in said second sample chamber, said electrode assembly producing an output signal as a function of a constituent of interest of the sample in said second chamber, a common pump system for applying reduced pressure to both sample chambers to produce flow of fluid into and out of said sample chambers and a common circulator system for circulating said thermostatically controlled fluid past said electrode assemblies and said sample chambers to maintain the sample chambers and electrode assemblies at a preestablished temperature.

9. The instrument as claimed in claim 8 wherein said sequencer in said first mode of operation sequentially operates said second valve to connect said sample chamber to said cleaning fluid while said third valve is connected to said high capacity pump, and then switches said third valve to said fourth position and closes said fourth valve.

* * * * *

UNITED STATES PATENT OFFICE
CERTIFICATE OF CORRECTION

PO-1050
(5/69)

Patent No. 3,658,478          Dated April 25, 1972

Inventor(s) Philip Spergel et al.

It is certified that error appears in the above-identified patent and that said Letters Patent are hereby corrected as shown below:

Column 2, line 72, delete the dash after the quotes;

Column 4, line 8, the numeral should read --3 1/2--;

Column 5, line 21, "T1" (second occurrence) should be --$\overline{T1}$--;

line 43, "EXTEND" should be --$\overline{EXTEND}$--;
lines 51-52, "END SAMPLE" should be --$\overline{END}$ $\overline{SAMPLE}$--;

Column 6,
line 4, "T1" should be --$\overline{T1}$--; (first occurrence)
line 21, "T1" should be --$\overline{T1}$--;
line 45, "SAMP" should be --$\overline{SAMP}$--;

Column 7, line 41, "T1" should be --$\overline{T1}$--;

Column 8, line 28, "T1" should be --$\overline{T1}$--.

Signed and sealed this 27th day of February 1973.

(SEAL)
Attest:

EDWARD M. FLETCHER, JR.
Attesting Officer

ROBERT GOTTSCHALK
Commissioner of Patents